US008452326B2

(12) United States Patent
Maguire

(10) Patent No.: US 8,452,326 B2
(45) Date of Patent: May 28, 2013

(54) ARRANGEMENT AND METHOD RELATING TO CONNECTION OF MOBILE STATIONS

(75) Inventor: Patrick Maguire, County Leitrim (IE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 576 days.

(21) Appl. No.: 12/663,874

(22) PCT Filed: Jun. 12, 2007

(86) PCT No.: PCT/EP2007/055747
§ 371 (c)(1),
(2), (4) Date: Dec. 10, 2009

(87) PCT Pub. No.: WO2008/151662
PCT Pub. Date: Dec. 18, 2008

(65) Prior Publication Data
US 2010/0184460 A1    Jul. 22, 2010

(51) Int. Cl.
*H04M 1/00* (2006.01)
(52) U.S. Cl.
USPC .......................... 455/552.1; 455/436; 455/437
(58) Field of Classification Search
USPC .............. 455/552.1, 436, 437, 438, 439, 445, 455/452.2, 453, 424, 560, 561, 428, 525
See application file for complete search history.

(56) References Cited

U.S. PATENT DOCUMENTS 7,136,651 B2 * 11/2006 Kalavade ...................... 455/445
7,177,294 B2 *  2/2007 Chen et al. ................... 370/338
2004/0121777 A1 *  6/2004 Schwarz et al. ............ 455/452.1
2006/0203756 A1 *  9/2006 Hu ................................ 370/312
2007/0243871 A1 * 10/2007 Chen et al. ................... 455/436
2007/0268858 A1 * 11/2007 Soto ............................. 370/328
2008/0104247 A1 *  5/2008 Venkatakrishnan et al. .. 709/226
2009/0156215 A1 *  6/2009 Pitkamaki .................... 455/437

FOREIGN PATENT DOCUMENTS

| CN | 1505907 A    | 6/2004  |
| WO | 00/28767 A1  | 5/2000  |
| WO | 02/080586 A2 | 10/2002 |
| WO | 02/089514 A1 | 11/2002 |

OTHER PUBLICATIONS

PCT International Search Report, dated Feb. 28, 2008, in connection with International Application No. PCT/EP2007/055747.
ETSI Technical Specification TS 143 051, V6.0.0 "Digital cellular telecommunications system (Phase 2+); GSM/EDGE Radio Access Network (GERAN) overall description; Stage 2 (3GPP TS 43.051 version 6.0.0 Release 6)" Mar. 2005.

(Continued)

*Primary Examiner* — Michael Faragalla
*Assistant Examiner* — Gerald Oliver
(74) *Attorney, Agent, or Firm* — Potomac Patent Group PLLC

(57) ABSTRACT

The present invention relates to an arrangement supporting dual mode operation or communication with a core network node using a first and a second mode via a first and a second interface respectively. It comprises parameter handling means adapted to collect or receive first parameters comprising configurable traffic load related parameters and second parameters comprising current network traffic dependent parameters. It also comprises selecting means comprising calculating means adapted to use the configurable parameters and the current parameters of the parameter handling means to select the first or the second mode as operation mode for a connection of a mobile station to the core network.

21 Claims, 6 Drawing Sheets

OTHER PUBLICATIONS

Chinese Office Action, dated Jul. 20, 2012, in connection with Chinese Patent Application No. 200780100112.2.

Translation of Chinese Office Action, dated Jul. 20, 2012, in connection with Chinese Patent Application No. 200780100112.2.

3GPP TS 43.051, Version 6.0.0 Technical Specification Group GSM/EDGE Radio Access Network; Overall description—Stage 2; (Release 6), Nov. 2003.

* cited by examiner

ARRANGEMENT AND METHOD RELATING TO CONNECTION OF MOBILE STATIONS

TECHNICAL FIELD

The present invention relates to controlling connection of mobile stations supporting dual mode communication, using a first mode and a second mode, to a core network.

BACKGROUND

Many mobile stations support dual or multi mode operation, i.e. support operation both in a first and in a second mode. Normally a mobile station operating in A or Gb mode will be connected to the core network via the A interface or the Gb interface respectively. The A interface is an interface between a BSS (Base Station Subsystem) and a 2G MSC (Mobile Switching Centre) whereas the Gb interface is an interface between a BSS and a 2G SGSN (Serving GPRS Support Node). In a similar manner, a mobile station operating in Iu mode will be connected to the core network via the Iu interface (Iu-ps is the interface between a BSS and a 3G MSC whereas Iu-cs is the interface between a BSS and a 3G SGSN).

For the GERAN (GSM/EDGE (Enhanced Data rates for Global Evolutions) radio access network) architecture a concept has been proposed with a 2G/3G capable cell, the associated RAN (Radio Access Network) of which may be connected to the core network using either the A/Gb interface or the Iu interface. In such a cell an MS is either operating in A/Gb mode, and is therefore connected to the core network via the A/Gb interface, or operating in Iu mode and is connected to the core network via the Iu interface.

Also for such a concept existing or conventional procedures for initial cell selection and cell reselection apply. Upon successful completion of cell selection/reselection, the mobile station must choose a mode of operation, assuming that the chosen cell is a combined 2G/3G capable cell.

Connection of a radio access network with the A/Gb interface and with the Iu interface to the core network are for example described in 3GPP TS 43.051 v6.0.0 (2003-11).

A GERAN cell can support A/Gb mode only, or Iu mode only, or both modes as discussed above. The support of each mode depends on the interfaces with which the GERAN is connected to core network nodes. The support of each mode of operation by a GERAN cell is indicated in broadcast system information and messages.

However, as far as mode selection is concerned, currently the Iu mode shall be selected in the target cell if Iu mode is supported by the cell and by the mobile station, unless otherwise ordered by the network.

If initial mode selection is fixed to one of the modes, if for example all Iu capable mobile stations are to select Iu mode in mixed mode cells as discussed above, the network may experience load problems which may strongly impact the performance. If for example a network is highly loaded and all Iu and A/Gb capable mobile stations have to select the Iu mode, Iu capable only mobile stations may be denied access to the network unless the network forces 2G-3G capable mobile stations to perform an inter-RAT handover. The signalling will also have a negative impact on network performance and possibly lead to service interruption. Such a solution is described in 3GPP TS 43.051 in section 5.3.

Alternatively or additionally unnecessary signalling will be introduced due to the implementation of a mode selection load sharing algorithm in the network which triggers inter-RAT (Radio Access Technology) handovers when required. Such signalling will have a negative impact on network performance and may lead to service interruption.

SUMMARY

It is an object of the present invention to overcome one or more of the above mentioned drawbacks. Particularly it is an object to provide a flexible solution through which unnecessary signalling can be avoided and through which high load as well low load conditions in the network can be handled in an optimal manner and through which load problems in the network can be avoided.

It is particularly an object of the invention to provide an arrangement and a method respectively through which selection of mode of operation can be optimized for a mobile station which is capable of operating in more than one mode, in a cell which supports more than one mode.

Therefore an arrangement is provided which supports dual mode operation or communication with a core network node via a first and a second interface respectively. The arrangement comprises parameter handling means which are adapted to collect or receive first parameters which are related to traffic load produced by mobile stations operating in the first and second mode respectively and which are configurable. The parameter handling means are also adapted to collect or receive second parameters which depend on network traffic currently produced by mobile stations operating in the respective modes. These current parameters may of course be related to current traffic or traffic observed at given time intervals etc., but for reasons of simplicity it is referred to as current network traffic. The arrangement also comprises selecting means for carrying out a selection of a mode for a mobile station connection. The selecting means comprise calculating means which are adapted to use the configurable parameters and the current parameters received or collected in parameter handling means to select which mode to use for a connection of a mobile station (via a dual mode operation supporting cell) to the core network, i.e. to select operation mode for mobile station.

It is an advantage of the invention that an arrangement and a method allowing a flexible and optimized mode selection are provided, particularly that the best connection mode for a mobile station can be selected.

It is also an advantage that mode selection can be controlled according to particular needs, desires and prevailing conditions, and that conditions for mode selection easily can be changed or modified.

It is also an advantage of the invention that unnecessary signalling can be avoided. Further yet it is an advantage that a solution is provided through which it can be avoided that mobile stations supporting only one mode are denied access unnecessarily.

BRIEF DESCRIPTION OF THE DRAWINGS

The invention will in the following be further described, in a non-limiting manner, and with reference to the accompanying drawings, in which.

DETAILED DESCRIPTION

Figure 1:
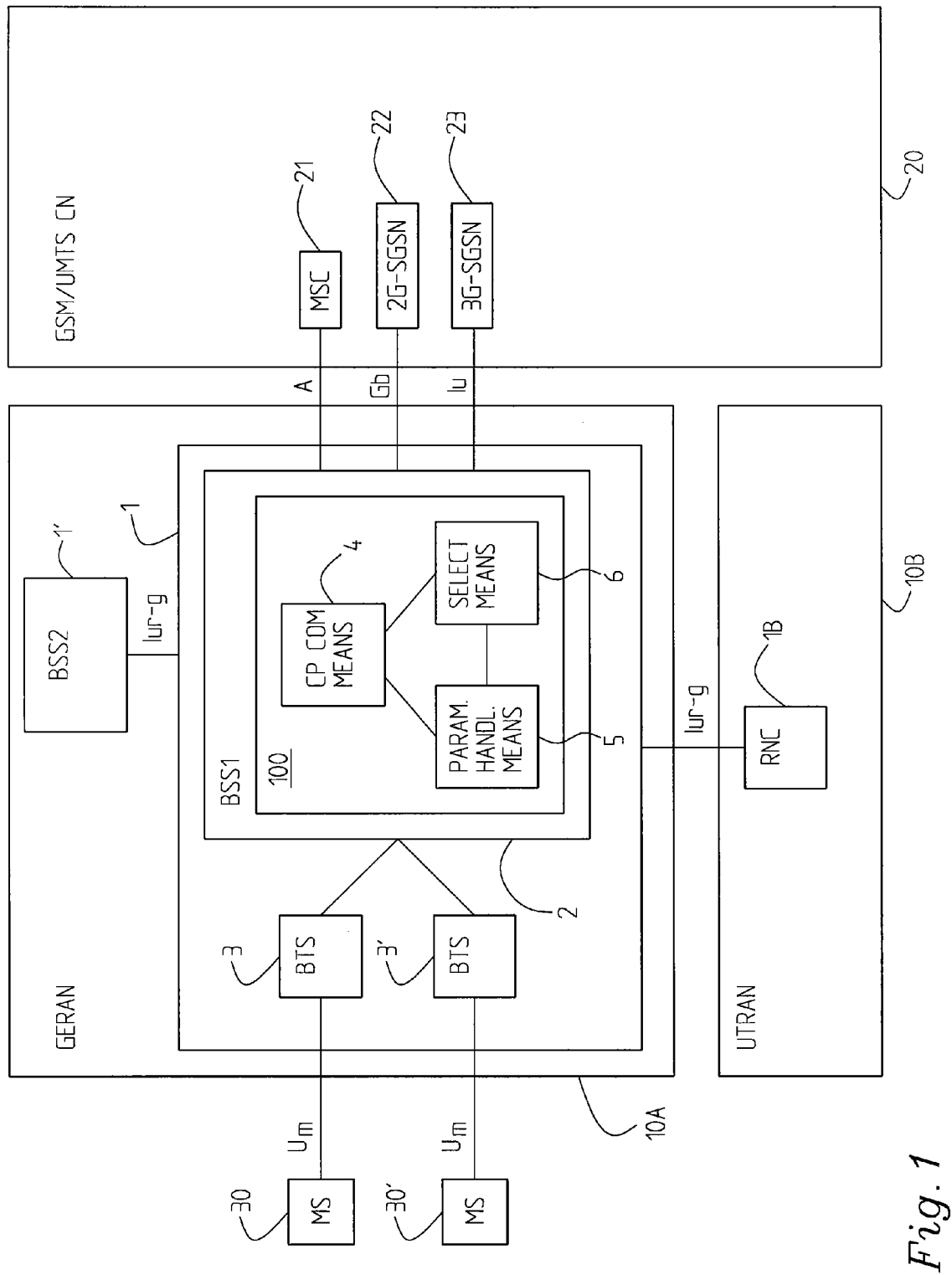
FIG. 1 is a schematical block diagram of a GERAN architecture in which the inventive concept is implemented.

According to the present invention network load information represented as configurable parameters and current parameters (i.e. calculated and detected values thereof respectively) as referred to above which is distributed or broadcasted in the network is used to select the best connection mode for a mobile station connection by the calculating means which particularly comprise an algorithm in the arrangement.

According to different embodiments, the arrangement may be implemented in a mobile station or in the network. This particularly means that the mode selection means comprising calculation means, preferably comprising a mode selection algorithm, can be hosted by a mobile station or by the network. If it is provided or hosted by the network (i.e. the radio access network) it may be provided in a base station subsystem, particularly in a base station controller (BSC). It may also be implemented in an RNC (Radio Network Controller) or in any similar node, or even in any other appropriate node, e.g. a separate or dedicated node. It may thus also be implemented separately but in communication with a radio access network node.

In a particular embodiment the arrangement, irrespectively of whether implemented in a mobile station or hosted in the network or by a radio access network node, is adapted to, or configured to, elect and support either the first or the second mode as a majority mode which supports handling a number of mobile stations which exceeds the number of mobile stations operating in the other, non-elected, mode. This is however an optional feature which is applicable with any other feature of the present invention.

The election of a majority mode may be carried out in different manners, by the operator, automatically or based on some relevant feature of the network, and it is preferably reconfigurable.

The parameter handling means are particularly adapted to (if the arrangement is hosted by a mobile station) receive the configurable parameters and the current parameters, preferably contained in or provided in broadcasted system information (SI/PSI, System Information/Packet System Information) and consisting of conventional broadcast system information messages which are broadcasted in any case. It is also possible to have the configurable and current parameters piggy-backed onto other messages, to provide such information in specific or dedicated messages according to other implementations. Generally it is most advantageous to use the broadcast SI/PSI messages which are sent periodically. In still other implementations it is possible to more actively collect such information for example with a given frequency although this might involve more signalling. The parameter handling means are particularly adapted to interpret or extract the configurable and the current parameters respectively. According to different embodiments the configurable parameters and the current parameters are provided periodically with the same frequency, or in the same messages. In an alternative implementation they are provided or collected with different frequencies, or in different messages (dedicated and/or conventional messages) (i.e. different frequencies for configurable and current parameters respectively).

If the arrangement is hosted in the radio network the parameters are provided or collected with any appropriate frequency, as above, but the information does not need to be broadcasted or similar since it is available (the current parameters) directly and generated in the radio access network itself.

In one particular implementation the calculating means, or more generally, the selecting means, are adapted to establish if a mobile station is in an idle state or not. In an alternative implementation this establishment forms part of an implemented mode selection algorithm.

In a preferable implementation the configurable parameters comprise indications of the maximum load of the first mode, i.e. a maximum load of (or produced by) mobile stations operating in the first mode and the second mode respectively in a cell supporting dual mode communication with a core network node.

Second configurable parameters are also preferably implemented which comprise an indication of a load threshold for mobile stations operating in the first mode in a cell, and an indication of a load threshold for mobile stations operating in the second mode in the cell, which means load thresholds for mobile stations operating in the first mode and in the second mode respectively.

The current parameters particularly comprise indications of the current load of the first mode and the second mode respectively in a cell supporting dual mode communication with a core network, i.e. the current load of mobile stations operating in the first mode and current load of mobile stations operating in the second mode respectively.

Evaluations of the current load, load evaluations, are particularly performed by the network, for example by an access network node such as a BSC or an RNC.

In one embodiment the first mode comprises the Iu mode and the second mode comprises the A/Gb mode or vice versa. Particularly, in a cell, one of the modes is elected to act as a majority mode, which means that one of the modes is elected or configured to support the (or a larger) proportion of mobile stations connected in that mode than in the other mode.

The calculating means are particularly adapted to implement the algorithm based on the received (or collected) configurable and current parameters to establish if a current operating mode of a mobile station is to be kept, i.e. selected, or if the other mode is to be selected as an operating mode for a mobile station connection. The selecting means, or the calculating means thereof, are adapted to determine if a switch or change of nodes should be done or not (or when it is to be done), if one or more requirements given in or forming the algorithm are met or not. To set up requirements particular definitions are given for the first and second configurable parameters and the current parameters are defined to indicate or detect the current value of the given parameters representing the load of MSs operating in the respective mode.

Preferably also a parameter is defined representing the maximum load allowable in the cell (i.e. the total load allowed to be produced by both modes). In one specific embodiment a first requirement states that the value of the current parameter is to be lower than the corresponding value of the first configurable parameter, for example maximum load value of the mode in the cell, and a second requirement states that the value of a current parameter is to be lower than the corresponding value of the threshold parameter, the second configurable parameter. These requirements can be used in different manners, of which a specific example will be discussed below.

In an advantageous implementation the selecting means are adapted to keep the current mode if the first requirement is met for the first mode, if not, to select the second mode, if the second requirement is met for the second mode, and otherwise to select the first mode. It should be clear that this is only one particular implementation.

In another implementation, or as a further feature of the implementation discussed above, the selecting means are adapted to select the second mode, elected as non-majority mode, if it is the current mode, i.e. the mode which is used by a mobile station for operation currently, if the second requirement is met for the second mode, or if the first, but not the second, requirement is met for the second mode and the second requirement is not met for the first mode, or if the first and the second requirements are not met for the second mode and the first requirement is not met for the first mode, otherwise to select the first, majority mode.

In one implementation as discussed above, the first mode is selected as a majority mode. However, as also discussed above the first mode may be the Iu mode or the A/Gb mode.

In one implementation the invention comprises or is adapted to be arranged in a mobile station.

In another implementation the arrangement is adapted to be provided in or in association with a node in a radio access network, for example a base station controller or radio network control node.

If the arrangement is provided in or hosted by the radio network, the broadcasted system information need not be extended, i.e. is not affected, but information about selected mode has to be provided to the mobile station. Preferably this is done in a conventional cell selection/cell reselection message that is sent anyway. It is however also possible to use dedicated messages for that purpose, or other messages sent in any case.

The invention also provides a method for controlling selection of operation mode for a dual mode mobile station supporting operation in a first mode and in a second mode for connection to a core network node. The connection to the core network node takes place over a first interface for first mode operation or a second interface for a second mode operation over a radio access network cell which supports first and second mode operation. The method comprises the steps of; configuring load related first configured parameters defining maximum allowed first mode load and maximum allowed second mode load in a cell, i.e. a configured parameter for each mode defining the maximum allowed load of mobile stations in the first mode and in the second mode respectively in the cell. The method also comprises a step of; configuring load related second configured parameters defining a first mode load threshold and a second mode load threshold respectively in the cell which means a threshold value for the load produced by or resulting from mobile stations operating in the first mode and a threshold value for the load caused by mobile stations operating in the second mode. The method also includes the steps of determining or detecting current load related parameters indicating the load caused by mobile stations operating in the first mode and the current load caused by mobile station operating in the second mode, in the cell. The configured and the current parameters may broadcasted in the network although they may alternatively be provided with specific messages or in any other appropriate manner with a given frequency which may be different for the configured parameters and the current parameters or the same for both types of parameters, the main thing mean that the parameter value information is collected by or provided to an arrangement handling mode selection. It should be clear that if the selection arrangement is provided on the radio network, the current parameter information is directly available in the network and the configured parameters are configured in the network, i.e. there is no need for e.g. broadcasting for this purpose.

The arrangement uses information about the configured and current parameters to select operation mode for a mobile station connection, i.e. it is selected if the mobile station is to operate in the first mode or in the second mode. This may particularly be done without considering in which mode it currently is operating, but it may also vary depending on whether it is operating in one or the other mode. Even more particularly one of the modes, for example the first mode, may be configured or elected as a majority mode, i.e. the mode capable or allowed to handle more mobile stations than the other mode. Depending on for example operator preferences, a cell can be configured to support first mode connected mobile stations representing a majority of the network load or second mode connected mobile stations representing a majority of the network load. Such an election or configuration of a majority mode is conveniently reconfigurable. In an advantageous implementation it allows adaption to varying conditions and/or operator needs in any appropriate manner.

The optional features of the embodiments discussed above with reference to the arrangement are also applicable options for the method.

FIG. 1 schematically illustrates a block diagram wherein a GERAN 10A connects with three interfaces, the A interface, the Gb interface and the Iu interface, to a GSM/UMTS core network (CN) 20. The CN 20 is only very schematically illustrated and it is shown how the GERAN 10A connects with the A interface to an MSC 21, with the Gb interface to a 2G-SGSN (Serving GPRS Support Node) 22 and with the Iu interface to a 3G-SGSN 23. In general, a combination comprising one, two or three of these interfaces is possible, but for the concept of the present invention the GERAN has to connect with at least two interfaces to the CN. Generally two base station sub-systems BSSs (or more) may be connected to each other with an Iur-g interface, but it should be clear that BSS2 1' merely is included to show that there can be more than one BSS and the inventive functionality is here supposed to be provided in BSS1 1. BSS1 1 in a conventional manner comprises a BSC (Base Station Controller) 2 connected to a number of BTSs, here BTS 3 and BTS 3' for connection of the mobile stations MS 30, MS 30' (over the Um interface). BSS1 1 may also for example be connected to an RNC 1B over UTRAN 10B with an Iur-g interface.

Mobile stations MS 30, MS 30' are dual mode MSs and 2G as well as 3G capable and the initial cell selected by e.g. MS 30' is a mixed mode cell. According to the present invention BSC 2 here hosts an arrangement 100 comprising CP (Control Plane) communication means 4 in a conventional manner handling control plane signalling (these means may also be seen as provided externally of the arrangement 100). The arrangement 100 in this embodiment comprises or is provided in a BSC 2 or more generally in a BSS 1. It comprises parameter handling means 5 and mode selection means 6. In this embodiment it is supposed that the BSS/BSC is adapted to configure configurable parameters for each mode to collect and current parameters for each mode. BSS/BSC is also adapted to provide the configured and the current parameters to mode selection means 6, which comprise calculating means (not shown here) which comprise or use a mode selection algorithm, as will be more thoroughly described below, to select mode for an MS connection. The current parameter information is generally collected by the BSC and it is here extracted from BSC information for use in the selecting means 6. The parameter handling means 5 are adapted to configure/calculate the configured parameters (this can also be done in the selecting means 6 or in separate means (not shown)). According to different embodiments the handling means and the selecting means are separate means or a combined means. Once a mode has been selected for an MS connection, since the selection in the embodiment takes place in the BSS, information has to be provided to the MS about selected mode.

Figure 2:
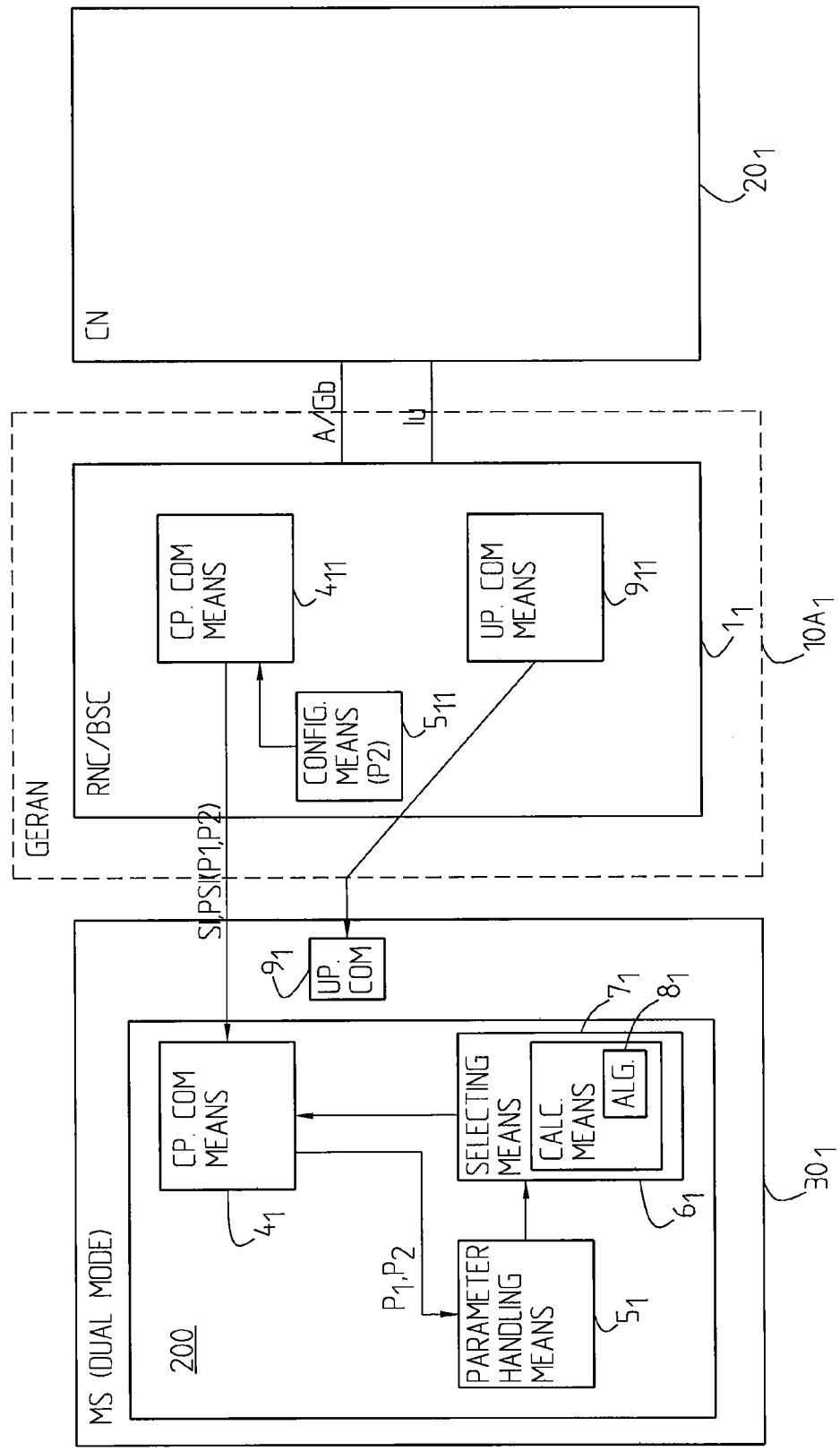
FIG. 2 is a block diagram very schematically describing a second implementation of the present invention wherein the selecting means are implemented in a mobile station.

FIG. 2 is a block diagram of a GERAN 10A$_1$ connecting to a core network CN 20$_1$ with the A/Gb interface and the Iu interface respectively through a RNC/BSC 1$_1$ which in a conventional manner comprises control plane CP communication means 4$_{11}$ and also in a conventional manner UP (User Plane) communication means 9$_{11}$. It should be clear that these means are only very schematically illustrated to show that control plane signalling and user plane communication take place. The arrangement 200 enabling mode selection, i.e. selection of mode of operation for a mobile station, in this embodiment comprises or is provided in a mobile station MS 30$_1$ which supports dual mode operation. The cell through which the MS 30 connects to the CN 20$_1$ must also support dual modes. The arrangement 200 comprises or communicates with (the latter implementation not explicitly shown in any figure) CP communication means 4$_1$ for control plane communication with the CP communication means 4$_{11}$ of RNC/BSC 1$_1$. It further comprises parameter handling means 5$_1$ adapted to collect or extract configurable parameters P1 for each mode and current parameters P2 for each mode broadcasted with the system information/packet system information. Parameters P1, P2 are then provided to selecting means 6$_1$ comprising calculation means 7$_1$ which comprise or include an algorithm 8$_1$ for selecting mode of operation for the mobile station 30$_1$. For the sake of completeness user plane communication means 9$_1$ are shown in the figure although these are of no significance for the present inventive concept.

Figure 3:
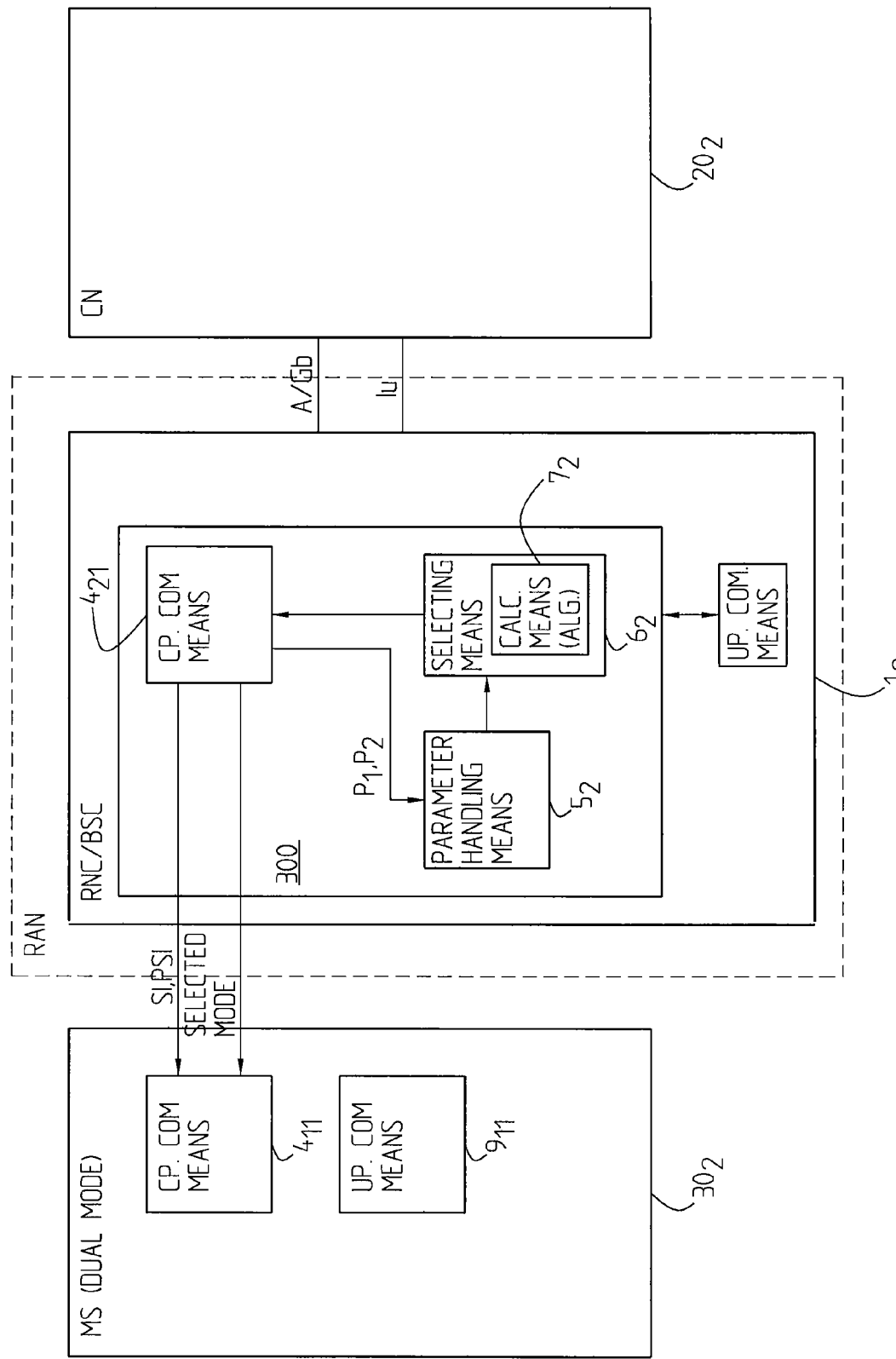
FIG. 3 is a schematical block diagram of an implementation of the present invention with selecting means implemented in a radio access network node.

An example of an algorithm, implemented in the calculating means 7$_1$ will be more thoroughly discussed below; FIGS. 1, 2 and 3 to follow merely showing how an arrangement enabling mode selection can be provided and where it can be provided.

It should be clear that the parameter handling means and the mode selecting means can be seen as a common means or as separate means as in these figure, which also is an advantageous implementation. The system information is according to the inventive concept extended with configured parameters and current parameters and it is broadcasted to the MS from the network with a given frequency. According to the said embodiment the configured and current parameters are provided or broadcasted with the same frequency although it is also possible to provide this information (current and configured parameters) in other messages or dedicated messages to the MS, with the same or different frequencies. The configured parameters may e.g. be provided with a lower frequency than the current parameters. Any specific implementation is in principle possible. The CP communication means 4$_{11}$ of the RNC/BSC 1, comprises configuring means 5$_{11}$ adapted to configure the configured parameters (P2).

FIG. 3 shows somewhat more in detail an implementation of an arrangement 300 provided in (or comprising) an RNC/BSC 1$_2$ similar to FIG. 1. Dual mode MS 30$_2$ with CP communication means 4$_2$ and UP communication means 9$_2$ connects to RNC/BSC 1$_2$, which connects with the A/Gb interface and Iu interface to CN 20$_2$. The arrangement 300 comprises CP communication means 4$_{21}$ (which alternatively are not included in, but in communication with the arrangement), parameter handling means 5$_2$ and selecting means 6$_2$ with calculating means preferably comprising an algorithm as discussed with reference to FIG. 2. The RNC/BSC 1$_2$ also comprises UP communication means 9$_{21}$ which however are not significant for the functioning of the inventive concept. In this case the information about the current parameters for the first and second mode is already available in RNC/BSC 1$_2$ and RNC/BSC is also connected to parameter handling means 5$_2$ adapted to configure configured parameters. It is supposed that the configuration means are included in parameter handling means 5$_2$ which hence are different from parameter handling means as provided in an arrangement 200 which is provided in the MS and which is simply extracts or handles the parameters, current as well as configured, for provision to the selecting means in which case configuring means are provided in the RNC/BSC 1$_1$ (cf. configuring means 5$_{11}$ of FIG. 2).

Thus, in an implementation as shown in FIG. 3 the conventional system information broadcasting is not affected by the provisioning of the first and second parameters, which here already are available in the RNC/BSC. As discussed with reference to FIGS. 1 and 2, the parameters are used in selecting means 6$_2$ (in calculation means) comprising an algorithm to select mode of operation for an MS connection. However, in this case the selection takes place in RNC/BSC 1$_2$, which means that information about selected mode has to be provided to the MS once a mode has been selected. (System information SI/PSI is provided unmodified and in a conventional manner, to MS 30$_2$). Thus, here a mode selection algorithm is hosted by the network and the selected mode of operation is indicated to the MS in the associated network to MS cell access signalling e.g. at cell selection and cell reselection.

A first configurable parameter is in an advantageous embodiment the maximum first mode load allowed in the cell, $P_{max}(1)$ and $P_{max}(2)$ for each mode. In an advantageous implementation one of the modes is selected as a majority mode which can be configured e.g. according to the operator needs. The majority mode is a mode configured to support connected mobile stations representing a majority of the network load. If the first mode is elected as a majority mode $P_{max}(1)$ indicates the maximum load of P1, which is the majority of the load and $P_{max}(2)$ represent the remaining load possible in the cell, i.e. what remains for the other mode or for the second mode. In one implementation these parameters were expressed as a percentage of maximum cell load (Load_Cell$_{max}$) thus occupying one octet (see below).

Respective second configurable parameters are given as first and second mode thresholds in the cell $P_{thr}(1)$, ($P_{thr}(2)$. These parameters are also configurable and the purpose of these thresholds is to protect network access for mobile stations which only support one of the first mode or the second mode. The second configurable parameters are preferably expressed as a percentage of maximum cell load thus occupying one octet.

The current parameters represent the respective current loads of the first and second modes $P_c(1)$, $P_c(2)$ respectively. These parameters are network controlled and represent the current load produced by mobile stations operating in the respective modes. Preferably the current parameters are expressed as a percentage of maximum cell load thus occupying one octet each.

In one implementation Load_Cell$_{max}$ is the number of frequencies in the cell*8*No. of allowed UL (Uplink)+DL (Downlink) TBFs (Temporary Block Flows) on a timeslot/Average MS classmark in the cell. If for example the first mode is elected as a majority mode and for example it is the Iu mode, $P_c(1)$ is the number of UL+DL TBFs carrying Iu traffic/Average MS classmark for all Iu capable mobile stations in the cell. If A/Gb is the second mode, $P_c(2)$ is the Number of UL+DL TBFs carrying A/Gb traffic/Average MS classmark for all A/Gb capable mobile stations in the cell. Using the above mentioned mode related information, a mode selection algorithm is developed in the arrangement, for example in a mobile station or hosted in the radio access network, for example in a node such as a BSC/RNC. An example of an algorithm will be discussed below with reference to FIG. 6.

Figure 4:
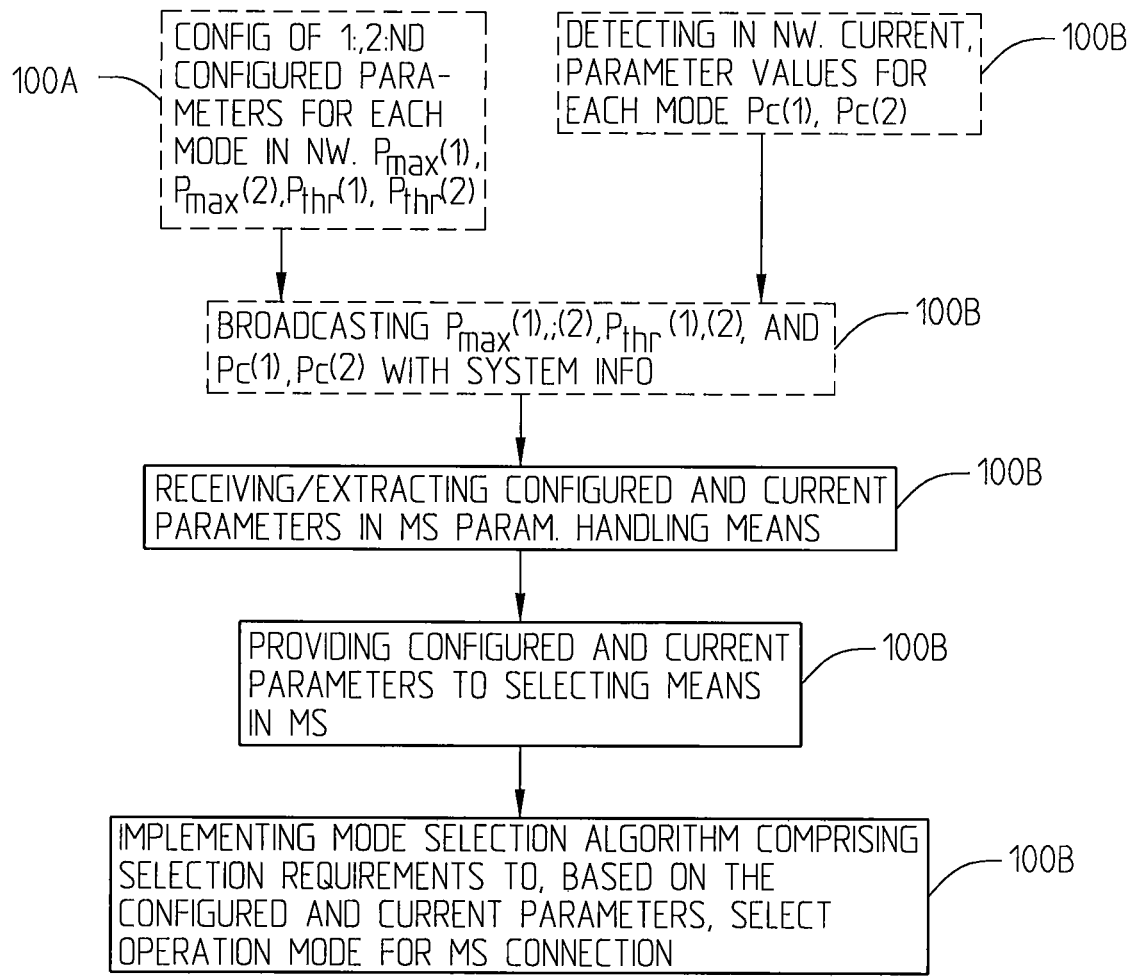
FIG. 4 is a schematical flow diagram describing a first implementation of the inventive concept.

FIG. 4 is a schematical flow diagram describing a procedure if the arrangement comprises or is implemented in a mobile station. It is thus supposed that first and second configured parameters for each network mode have been configured in the network, $P_{max}(1)$, $P_{max}(2)$ and $P_{thr}(1)$, $P_{thr}(2)$, 100A, (dashed lines are used since the configuration of these parameters takes place in the network and not in the arrangement itself). In the network current parameter values are detected or established for each mode, $P_c(1)$, $P_c(2)$, 100B, (also illustrated with dashed lines since it takes place in the network and not in the mobile station hosting the arrangement). The configured and current parameters are broadcasted periodically with system information to a mobile station, 101, and the mobile station receives/extracts the configured and current parameters in MS parameter handling means, 102. The configured and current parameters are provided to selecting means arranged in the MS, 103, and in the selecting means a mode selection algorithm is implemented which comprises or is based on selection requirements to, based on the configured and current parameters, select operation mode for the MS connection via the cell to the core network, 104.

Figure 5:
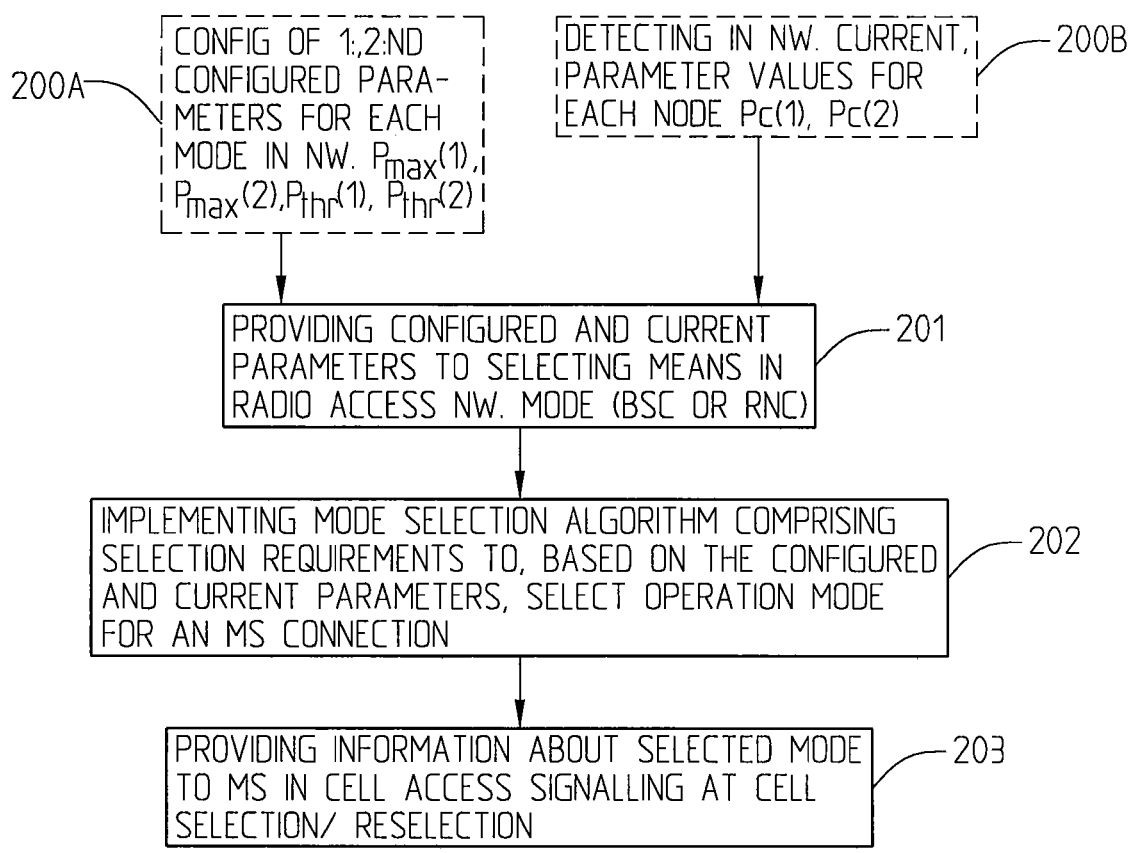
FIG. 5 is a schematical flow diagram describing a second implementation of the inventive concept.

FIG. 5 is a flow diagram describing in a schematical manner a procedure when the arrangement is implemented in or comprises a radio access network node, for example a BSC or an RNC. In the radio network node, first and second configured parameters are configured for each mode, $P_{max}(1)$, $P_{max}(2)$ and $P_{thr}(1)$, $P_{thr}(2)$, 200A. Also, the current parameter values are established or detected for each mode, $P_c(1)$, $P_c(2)$, 200B. The configured and current parameters are provided to, or collected by, the selecting means in radio access network node, 201.

System information is periodically broadcasted to the MS, but in this embodiment the system information does not have to include the first and second parameters since the mode selection arrangement is provided in the radio access network node itself. In the mode selection means mode a selection algorithm is implemented which comprises selection requirements to, based on the configured and current parameters already available, select operation mode for an MS connection, 202. When a mode has been selected, information about which mode actually has been selected must be provided to the MS, preferably this is done in cell access signalling at cell selection/reselection (at completion thereof), 203. In this embodiment system information broadcasting is not affected, but on the other hand information has to be provided to the MS after selection of mode has been done.

Figure 6:
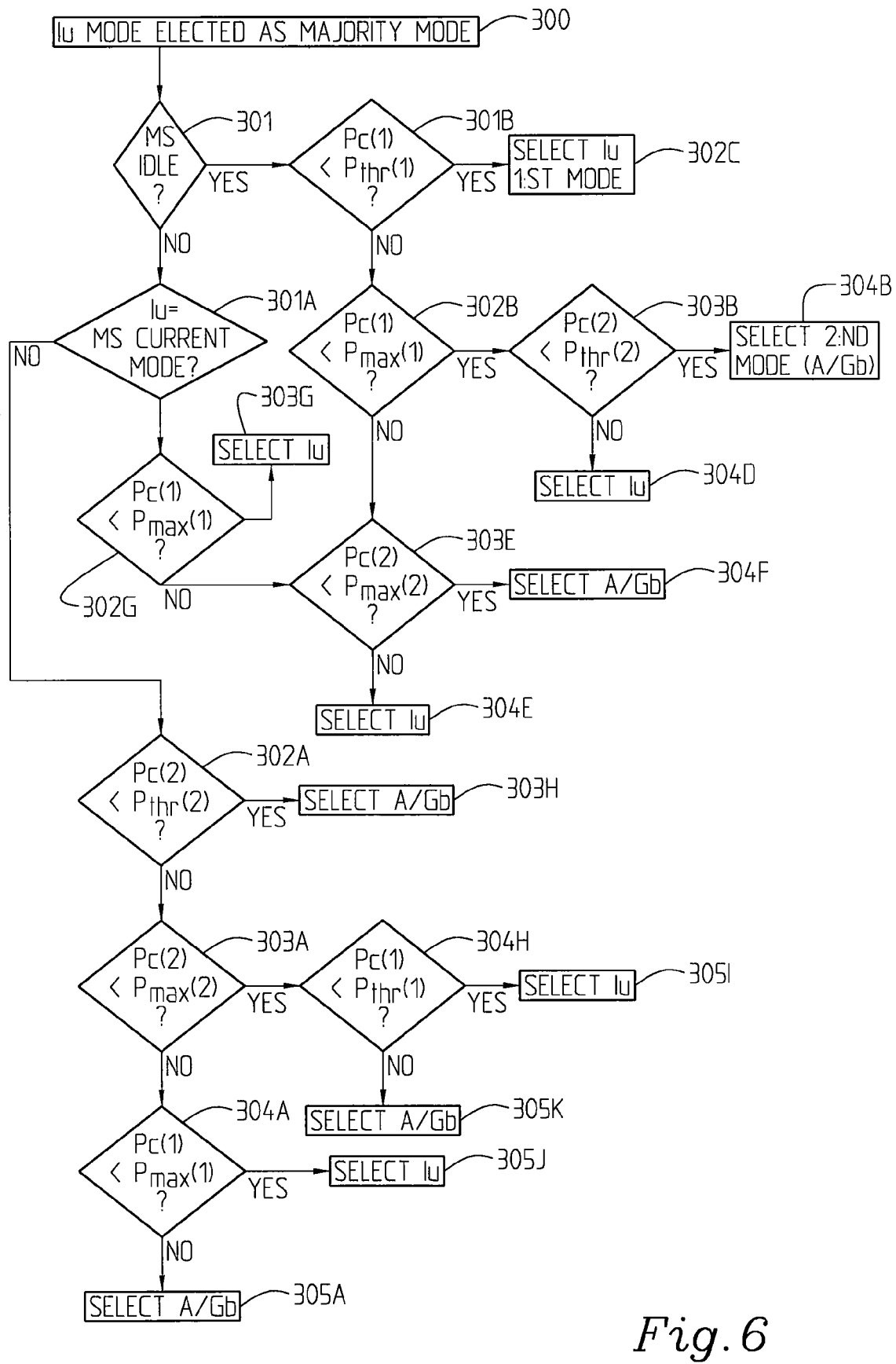
FIG. 6 is a flow diagram describing one specific implementation of an algorithm implemented in the calculating/selecting means.

With reference to FIG. 6 a specific example of a mode selection algorithm will be discussed. It is supposed that the Iu mode is configured or elected as majority mode. It should be clear that the concept is applicable in a corresponding manner if instead the A/Gb mode is configured or elected as a majority mode. The illustrated algorithm is applicable irrespectively of whether the arrangement is implemented in or comprises an MS or in or in association (communication) with a radio access network node, where, as discussed above, in the first case the configurable as well as the current (network controlled) parameters are broadcasted in the cell periodically (or provided in any other appropriate manner to the MS) whereas in the second case they are configured and already are available respectively in the radio access network node. If instead the arrangement is hosted by the network in another node or in a specific node, they may have to be provided to that specific host from e.g. an RNC or a BSC.

Thus, it is here supposed that the Iu mode (here also denoted first mode) is configured as majority mode, 300. First it is then examined if the MS is idle or not, 301. Preferably the algorithm determines or selects MS mode after cell selection and cell reselection when the MS is/is not in idle mode.

If the MS is in idle mode, it is established if $P_c(1)$ is lower than $P_{thr}(1)$, i.e. if the current Iu mode related load is lower than the Iu mode threshold, 301B. If yes, the first mode, here Iu mode, is selected, 302C. If not, it is established if the current load of the first mode, $P_c(1)$, is lower than $P_{max}(1)$, i.e. maximum Iu mode related load, 302B. If yes, it is examined if the current load of the second mode, $P_c(2)$, i.e. here the A/Gb mode, is below the threshold value for the second mode, $P_{thr}(2)$, 303B. If not, the Iu mode is selected, 304D, otherwise the second mode is selected, 304B, i.e. here A/Gb mode.

If however in step 302B it was established that the current load of the Iu mode $P_c(1)$ is not lower than the maximum Iu mode load $P_{max}(1)$, it is established if the current load of the second mode $P_c(2)$ is lower than the maximum load of the second mode $P_{max}(2)$, 303E. If yes, the A/Gb or the second mode is selected, 304F. Otherwise the Iu, i.e. the first mode, is selected, 304E.

If the MS was found not to be in the idle mode (step 301 above), it is examined if the elected majority mode, here the Iu mode, is the current mode of the MS, 301A. If yes, it is examined if the current load of the first mode ($P_c(1)$) is lower than the maximum first mode load ($P_{max}(1)$, 302G. If yes, the first, Iu, mode is selected, 303H. If not, it is examined if the current load of the second mode ($P_c(2)$) is lower than the maximum value for the second mode ($P_{max}(2)$), 303E. If yes, the second, A/Gb, mode is selected, 304F, otherwise Iu mode is selected, 304E.

If, on the other hand, it was established, in step 301A above, that the Iu mode is not the current mode of the MS, it is established if the current load of the second mode ($P_c(2)$) is lower than the threshold value of the second mode ($P_{thr}(2)$), 302A. If yes, the second, A/Gb, mode is selected, 303G. If not, it is examined if the current load of the second mode is lower than the maximum value of the second mode, 303A. If yes, it is examined if the current value of the first mode is lower than the threshold value for the first mode, 304H. If yes, the first mode or the Iu mode is selected, 305I. If not, the second mode or the A/Gb mode is selected, 305K. If on the other hand it was established in step 303A above, that the current load of the second mode is not below the maximum value of the second mode, it is examined if the current value of the first mode is below the maximum value of the first mode, 304A. If yes, the first, Iu, mode is selected, 305J. Otherwise the second, A/Gb, mode is selected, 305A.

As can be seen the algorithm is based on a number of requirements. The requirements that a current parameter value should be lower than the value of a configured parameter could of course be replaced by requirements stating that the current parameter value should be lower than or equal to the respective configured parameter. Also other criteria or requirements can be set up in the algorithm for mode selection. It is also possible to use algorithms which are not based on one of the modes being selected as a majority mode. It could also be applied for multimode, i.e. more than two modes, implementations. It should also be clear that any requirement can be reversed.

It is an advantage of the invention that signalling can be reduced in the network which means that the performance can be increased. It is also an advantage that it reduces the risks for service interruptions. It is also an advantage that subscribers whose mobile stations are only single-mode capable, i.e. only support one mode, are less likely to be refused access to the network. Moreover network optimization can be improved. Still further an operator can use the configurable parameters to migrate subscribers between e.g. 2G and 3G networks.

It should be clear that the invention is not limited to the specifically illustrated embodiments, but that it can be varied in a number of ways within the scope of the appended claims. Particularly it is not limited to the specifically exemplified radio access networks and modes etc. but it is more generally applicable to different types of networks, mode types, number of modes etc.

The invention claimed is:

1. An arrangement supporting dual mode operation or communication with a core network using a first and a second mode via a first and a second interface respectively, comprising a parameter handler configured for collecting or receiving first parameters comprising configurable traffic load related parameters and second parameters comprising current network traffic dependent parameters, and a selector comprising a calculator, the selector being configured for using the configurable parameters and the current parameters of the parameter handler to select the first or the second mode as operation mode for communication between a mobile station and the core network, wherein the parameter handler is configured for receiving and/or collecting the first and second parameters periodically with a frequency which is common for the first and second parameters or at frequencies which are different for the configurable and the current parameters respectively.

2. An arrangement according to claim 1, wherein the arrangement is adapted to configure or elect the first or the second mode as a majority mode supporting handling of a number of mobile stations which exceeds the number of mobile stations operating in the other, non-elected, mode.

3. An arrangement according to claim 1, wherein respective first configurable parameters comprise indications of maximum load of mobile stations operating in the first mode and in the second mode respectively in a cell supporting dual mode communication with the core network.

4. An arrangement according to claim 1, wherein respective second configurable parameters comprise load threshold values relating to mobile stations operating in the first mode and the second mode respectively in a cell supporting dual mode communication with the core network.

5. An arrangement according to claim 1, wherein respective current parameters comprise indications of the current load produced by mobile stations operating in the first mode and in the second mode respectively in a cell supporting dual mode communication with a core network.

6. An arrangement according to claim 1, wherein the first mode comprises Iu mode and the second mode comprises A/Gb mode or vice versa.

7. An arrangement according to claim 1, wherein the calculator is configured for implementing the algorithm based on the collected and/or received configurable and current parameters to establish if a current operating mode of a mobile station is to be kept, or selected, or if the other mode is to be selected as an operating mode for a mobile station connection based on a number of requirements given in or forming the algorithm.

8. An arrangement according to claim 7, wherein a first requirement states that the value of a current parameter is to be lower than the corresponding maximum load value or the value of the first configurable parameter of a mode in the cell, and that a second requirement states that the value of a current parameter is to be lower than the corresponding threshold value or the value of the corresponding second configurable parameter of a mode.

9. An arrangement according to claim 8, wherein the selector is configured to keep a current mode as operating mode for a mobile station if the first requirement is met for the first mode, otherwise to select the second mode only if the second requirement is met for the second mode.

10. An arrangement according to claim 8, wherein the first mode is elected or configured as majority mode and the selector is configured to select the second, non-majority, mode if it is the current mode and if the second requirement is met for the second mode, or if the first, but not the second, requirement is met for the second mode and the second requirement is not met for the first mode, or if the first and second requirements are not met for the second mode and the first requirement is not met for the first mode, then otherwise to select the first, majority, mode.

11. An arrangement according to claim 1, wherein the arrangement is adapted to comprise, or to be provided in or in association with, a node of a radio access network and to collect or receive and configure respectively the first and second parameters from said node.

12. An arrangement according to claim 11, wherein the arrangement is adapted to be provided in or comprises a base station controller of a base station sub-system or a radio network control node.

13. An arrangement according to claim 11, wherein the arrangement is adapted to provide information about selected mode for operation of a mobile station to the mobile station in a dedicated message or in cell selection/cell reselection messages.

14. A method for controlling selection of operation mode for a dual mode mobile station supporting operation in a first mode and in a second mode for connection to a core network node over a radio access network cell supporting first and second mode operation using a first interface for first mode operation and a second interface for second mode operation, comprising the steps of:

configuring load related first configured parameters defining maximum allowed first mode load and maximum allowed second mode load in a cell, and load related second configured parameters defining a first mode load threshold and second mode load threshold respectively in the cell;

determining/detecting current load related parameters indicating current first mode load and current second mode load respectively in the cell;

providing the configured and the current parameters to a mode selecting arrangement;

using the configured and the current parameters to select the first or the second mode as operation mode for connecting a mobile to the core network;

electing the first mode as majority mode;

examining if the mobile station is in idle mode or not; if not, examining if current operation mode of the mobile station is the first mode; if yes, keeping the mobile station in the first, current, mode if the first requirement of the first mode is met or if the first requirement of the first mode and the second requirement of the second mode are not met; otherwise, selecting the second mode, if the second mode is the current mode, keeping the current, second, mode if the second requirement of the second mode is met: otherwise, examining if the first requirement of the second mode is met; if yes, selecting the first mode if the second requirement of the first mode is met, otherwise selecting the second mode; if not, examining if the first requirement of the first mode is met; if yes, selecting the first mode, otherwise selecting or keeping the second mode.

15. A method according to claim 14, comprising the step of:
configuring the cell to support a majority of first or second mode connected mobile stations.

16. A method according to claim 14, wherein the algorithm providing/defining steps comprise:
defining a first requirement for the first mode according to which the current load of the first mode should be lower than maximum allowed load of the first mode;
defining a first requirement for the second mode according to which the current load of the second mode should be lower than the maximum allowed load of the second mode;
defining a second requirement for the first mode according to which the current load of the first mode should be lower than the threshold value for the first mode; and
defining a second requirement for the second mode according to which the current load of the second mode should be lower than the threshold value for the second mode.

17. A method according to claim 14, comprising the steps of, if the mobile station is in idle mode:
examining if the second requirement of the first mode is met; if yes,
selecting the first mode; otherwise,
switching to the second mode if the first requirement of the first mode is met and if also the second requirement of the second mode is met, or if the first requirement of the first mode is not met and the first requirement of the second mode is met; otherwise,
keeping the first mode.

18. A method according to claim 14, wherein the first mode is an Iu-mode and the second mode is an A/Gb mode or vice versa.

19. A method according to claim 14, comprising the steps of:
providing the configured and current parameters periodically from a radio network node;
receiving the configured and the current parameters in a node selection arrangement provided in the mobile station; and
using the configured and the current parameters in a mode selector in the mobile station to select mode.

20. A method according to claim 14, comprising the steps of:
collecting the configured and the current parameters in a radio access network node;
using the configured and the current parameters in a selector in the radio access network node; and
providing information about mode selected as operation mode for the mobile station to the mobile station.

21. A method according to claim 19, wherein the parameter providing step comprises:
broadcasting the configured and the current parameters in dedicated messages or in cell selection/cell reselection messages.

* * * * *

UNITED STATES PATENT AND TRADEMARK OFFICE
CERTIFICATE OF CORRECTION

PATENT NO. : 8,452,326 B2  
APPLICATION NO. : 12/663874  
DATED : May 28, 2013  
INVENTOR(S) : Maguire Page 1 of 1

It is certified that error appears in the above-identified patent and that said Letters Patent is hereby corrected as shown below:

In the Specification:

In Column 8, Line 48, delete "$(P_{thr}(2)$." and insert -- $P_{thr}(2)$. --, therefor.

In the Claims:

In Column 11, Line 61, in Claim 6, delete "lu mode" and insert -- Iu mode --, therefor.

In Column 14, Line 9, in Claim 18, delete "lu-mode" and insert -- Iu mode --, therefor.

Signed and Sealed this  
Thirteenth Day of May, 2014

Michelle K. Lee  
*Deputy Director of the United States Patent and Trademark Office*